No. 668,770. Patented Feb. 26, 1901.
W. H. BROOK.
FENDER.
(Application filed Jan. 31, 1900.)
(No Model.)

Witnesses:
A. P. Benford
J. J. Teague

Inventor:
William H Brook

UNITED STATES PATENT OFFICE.

WILLIAM HENRY BROOK, OF TYUS, GEORGIA.

FENDER.

SPECIFICATION forming part of Letters Patent No. 668,770, dated February 26, 1901.

Application filed January 31, 1900. Serial No. 3,555. (No model.)

*To all whom it may concern:*

Be it known that I, WILLIAM HENRY BROOK, a citizen of the United States, residing at Tyus, in the county of Carroll and State of Georgia, have invented new and useful Improvements in Fenders for Plows, of which the following is a specification.

The invention relates to improvements in fenders for plows; and it consists in the construction and novel combination of parts hereinafter described, illustrated in the accompanying drawings, and pointed out in the appended claim.

Figure 1:
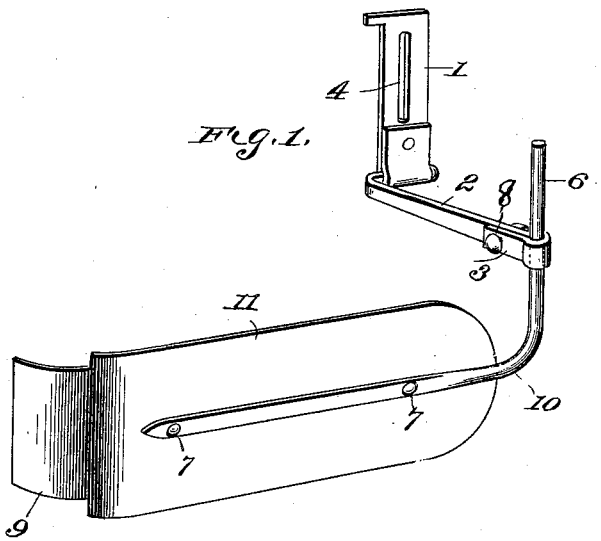
Figure 2:
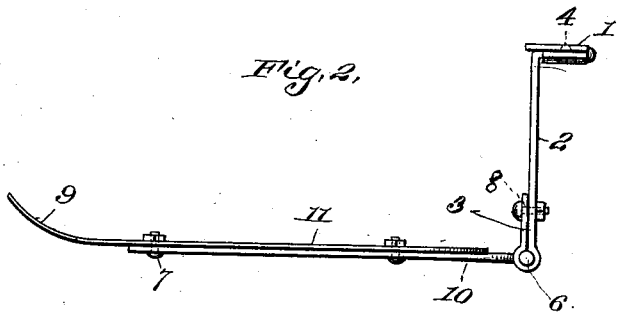

Figure 1 is a perspective view of a fender embodying my invention. Fig. 2 is a plan view.

Referring to the drawings, 1 indicates a plate provided with a longitudinal slot 4.

2 represents a bar provided at one end with a spindle, which hinges in the lower end of the plate 1.

3 is a socket on the end of bar 2, through which the vertical standard 6 of bar 10 projects, the other end of the bar 2 being bent at a right angle and journaled in a loop or socket formed by bending the lower end of the bar 2 upon itself, the outer end of the bent journaled bar 2 being provided with an enlarged head to prevent its being withdrawn from the said socket. The fender-plate 11 is rigidly bolted to the horizontally and rearwardly bent portion of the bar 10 by two small bolts 7 7, headed at one end and threaded at the other for the reception of a nut. The vertical standard 6 of bar 10 is held in a socket on the end of bar 2 by a small bolt 8, headed at one end and threaded at the other for the reception of a nut. By loosening the bolt in longitudinal slot 4 the plate 1 can be turned right or left, thereby setting the socket on the end of bar 2 any desired distance from the plow-beam, and also by this means a forward or backward adjustment of the fender-plate may be had. Having thus set the fender the desired distance from the plow, then loosen bolt 8 in the socketed end of the bar 2, and the vertical standard 6 of bar 10 can be turned in the socket until the fender-plate is in any position wanted, and also the vertical standard can be run up or down, so as to make the fender-plate 11 run on the ground or above it, so as to allow the pulverized soil to pass under toward the row of plants in such a quantity as is desired, while protecting the plants from too much soil, and at the same time the rocks and clods and trash are carried behind the plow and dropped in the furrow. Plate 1 and bar 2, forming a hinge, allows the fender-plate 11 to pass over rough ground and rocks, &c., and as soon as it passes over drops back in its right position.

Having described my invention, what I claim as new, and desire to secure by Letters Patent, is—

In a fender the combination of the plate 1 the bar 2 journaled in the lower end of the plate the standard 6 projecting through the socketed end of bar 2 the fender 11 provided with an inwardly-curved portion at its rear end and rigidly bolted to the horizontally and rearwardly bent portion of the bar 10 as and for the purpose described and shown.

In testimony that I claim the foregoing as my own I have hereto affixed my signature in the presence of two witnesses.

WILLIAM HENRY BROOK.

Witnesses:
   H. F. COPELAND,
   J. E. WADE.